United States Patent

Bar

[11] Patent Number: 5,828,511
[45] Date of Patent: Oct. 27, 1998

[54] WRITING AND READING HIGH DENSITY MAGNETIC TAPES

[75] Inventor: Refael Bar, San Diego, Calif.

[73] Assignee: Iomega Corporation, Roy, Utah

[21] Appl. No.: 635,717

[22] Filed: Apr. 22, 1996

[51] Int. Cl.[6] .................................................. G11B 20/12
[52] U.S. Cl. ...................... 360/69; 360/72.2; 360/78.02
[58] Field of Search .............................. 360/77.12, 78.02, 360/72.2, 75, 27, 69, 48

[56] References Cited

U.S. PATENT DOCUMENTS

| Re. 35,205 | 4/1996 | Bar ................................... 360/77.12 X |
|---|---|---|
| 4,054,947 | 10/1977 | Shanks et al. . |
| 4,298,897 | 11/1981 | Arter et al. ...................... 360/77.01 X |
| 4,819,092 | 4/1989 | Richards ................................... 360/27 |
| 5,210,664 | 5/1993 | Perona . |
| 5,218,487 | 6/1993 | Richmond . |
| 5,268,802 | 12/1993 | Bar ................................... 360/77.12 X |
| 5,276,566 | 1/1994 | Clifford, Jr. ............................. 360/75 X |
| 5,289,328 | 2/1994 | Saliba ..................................... 360/121 |
| 5,321,570 | 6/1994 | Behr et al. ......................... 360/77.12 X |
| 5,523,904 | 6/1996 | Saliba ................................... 360/77.12 |

FOREIGN PATENT DOCUMENTS

| 57-191817 | 5/1981 | Japan . |
|---|---|---|
| 63-259804 | 4/1987 | Japan . |
| 4-186559 | 11/1990 | Japan . |

OTHER PUBLICATIONS

"0IC–3020, Serial Recorded Magnetic Tape Minicartridge for Information Interchange Development Standard", published by Quarter–Inch Cartridge Drive Standards, Inc., 311 E. Carrillo Str., Santa Barbara, CA 93101.

Primary Examiner—Aristotelis M. Psitos
Assistant Examiner—James L. Habermehl
Attorney, Agent, or Firm—Woodcock Washburn Kurtz Mackiewicz & Norris LLP

[57] ABSTRACT

A tape drive writes/reads tapes written in a format which stores an increased amount of data because the tracks overlap. The wide write/narrow read heads read a center portion of each track which does not have overlap. The new format is identified by the positions of a reference burst, by encryption of the bad sector map, and by alteration of the tape signature to prevent unqualified drives and software from operating upon tapes in the new format.

14 Claims, 10 Drawing Sheets

Start of tape header for QIC3020 tape
*******************************************

| offset | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 000000 | 55 | AA | 55 | AA | 04 | 00 | 00 | 00 | 01 | 00 | 02 | 00 | 53 | D3 | 0C | 0B |
| 000016 | 5C | 34 | 0C | 0B | 5C | 34 | 00 | 00 | 3A | 04 | 32 | 35 | FE | 80 | 72 | 65 |
| 000032 | 76 | 61 | 63 | 20 | 20 | 20 | 20 | 20 | 20 | 20 | 20 | 20 | 20 | 20 | 20 | 20 |
| 000048 | 20 | 20 | 20 | 20 | 20 | 20 | 20 | 20 | 20 | 20 | 20 | 20 | 20 | 20 | 20 | 20 |
| 000064 | 20 | 20 | 20 | 20 | 20 | 20 | 20 | 20 | 20 | 20 | 0C | 0B | 5C | 34 | 00 | 00 |
| 000080 | 00 | 00 | 00 | 00 | 00 | 00 | 00 | 00 | 00 | 00 | 00 | 00 | 00 | 00 | 00 | 00 |
| 000096 | 00 | 00 | 00 | 00 | 00 | 00 | 00 | 00 | 00 | 00 | 00 | 00 | 00 | 00 | 00 | 00 |
| 000112 | 00 | 00 | 00 | 00 | 00 | 00 | 00 | 00 | 00 | 00 | 00 | 00 | 00 | 00 | 00 | 00 |
| 000128 | 00 | 00 | 00 | 00 | 00 | 00 | 00 | 00 | 00 | 00 | 0C | 0B | 5C | 34 | 01 | 00 |
| 000144 | 00 | 00 | 41 | 72 | 63 | 61 | 64 | 61 | 20 | 53 | 6F | 66 | 74 | 77 | 61 | 72 |
| 000160 | 65 | 2C | 20 | 49 | 6E | 63 | 2E | 20 | 20 | 20 | 20 | 20 | 20 | 20 | 20 | 20 |
| 000176 | 20 | 20 | 20 | 20 | 20 | 20 | 20 | 20 | 20 | 20 | 20 | 20 | 20 | 20 | 55 | 73 |
| 000192 | 65 | 72 | 20 | 46 | 6F | 72 | 6D | 61 | 74 | 74 | 65 | 64 | 2C | 20 | 51 | 49 |
| 000208 | 43 | 33 | 30 | 32 | 30 | 20 | 72 | 65 | 76 | 20 | 42 | 2C | 20 | 4D | 61 | 6E |
| 000224 | 75 | 20 | 30 | 37 | 2E | 00 | 55 | 73 | 65 | 20 | 00 | 00 | 00 | 00 | 00 | 00 |
| 000240 | 00 | 00 | 00 | 00 | 00 | 00 | 00 | 00 | 00 | 00 | 00 | 00 | 00 | 00 | 00 | 00 |

Start of Bad Sector Map for 3020 tape
*******************************************

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 000256 | F7 | 04 | 00 | 52 | A4 | 00 | 97 | A8 | 00 | B4 | F5 | 00 | 15 | 0F | 01 | 00 |
| 000272 | 00 | 00 | 00 | 00 | 00 | 00 | 00 | 00 | 00 | 00 | 00 | 00 | 00 | 00 | 00 | 00 |
| 000288 | 00 | 00 | 00 | 00 | 00 | 00 | 00 | 00 | 00 | 00 | 00 | 00 | 00 | 00 | 00 | 00 |
| 000304 | 00 | 00 | 00 | 00 | 00 | 00 | 00 | 00 | 00 | 00 | 00 | 00 | 00 | 00 | 00 | 00 |
| 000320 | 00 | 00 | 00 | 00 | 00 | 00 | 00 | 00 | 00 | 00 | 00 | 00 | 00 | 00 | 00 | 00 |
| 000336 | 00 | 00 | 00 | 00 | 00 | 00 | 00 | 00 | 00 | 00 | 00 | 00 | 00 | 00 | 00 | 00 |
| 000352 | 00 | 00 | 00 | 00 | 00 | 00 | 00 | 00 | 00 | 00 | 00 | 00 | 00 | 00 | 00 | 00 |
| 000368 | 00 | 00 | 00 | 00 | 00 | 00 | 00 | 00 | 00 | 00 | 00 | 00 | 00 | 00 | 00 | 00 |
| 000384 | 00 | 00 | 00 | 00 | 00 | 00 | 00 | 00 | 00 | 00 | 00 | 00 | 00 | 00 | 00 | 00 |
| 000400 | 00 | 00 | 00 | 00 | 00 | 00 | 00 | 00 | 00 | 00 | 00 | 00 | 00 | 00 | 00 | 00 |
| 000416 | 00 | 00 | 00 | 00 | 00 | 00 | 00 | 00 | 00 | 00 | 00 | 00 | 00 | 00 | 00 | 00 |
| 000432 | 00 | 00 | 00 | 00 | 00 | 00 | 00 | 00 | 00 | 00 | 00 | 00 | 00 | 00 | 00 | 00 |
| 000464 | 00 | 00 | 00 | 00 | 00 | 00 | 00 | 00 | 00 | 00 | 00 | 00 | 00 | 00 | 00 | 00 |
| 000480 | 00 | 00 | 00 | 00 | 00 | 00 | 00 | 00 | 00 | 00 | 00 | 00 | 00 | 00 | 00 | 00 |
| 000496 | 00 | 00 | 00 | 00 | 00 | 00 | 00 | 00 | 00 | 00 | 00 | 00 | 00 | 00 | 00 | 00 |

Bad Sector Map continues up to byte 29440

FIG. 10

Start of tape header for Ditto 5000 tape
*******************************************

| offset | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 000000 | 28 | 82 | 28 | 82 | 04 | 00 | 00 | 00 | 01 | 00 | 02 | 00 | 53 | D3 | 0C | 0B |
| 000016 | 5C | 34 | 0C | 0B | 5C | 34 | 00 | 00 | 3A | 04 | 32 | 35 | FE | 80 | 72 | 65 |
| 000032 | 76 | 61 | 63 | 20 | 20 | 20 | 20 | 20 | 20 | 20 | 20 | 20 | 20 | 20 | 20 | 20 |
| 000048 | 20 | 20 | 20 | 20 | 20 | 20 | 20 | 20 | 20 | 20 | 20 | 20 | 20 | 20 | 20 | 20 |
| 000064 | 20 | 20 | 20 | 20 | 20 | 20 | 20 | 20 | 20 | 20 | 0C | 0B | 5C | 34 | 00 | 00 |
| 000080 | 00 | 00 | 00 | 00 | 00 | 00 | 00 | 00 | 00 | 00 | 00 | 00 | 00 | 00 | 00 | 00 |
| 000096 | 00 | 00 | 00 | 00 | 00 | 00 | 00 | 00 | 00 | 00 | 00 | 00 | 00 | 00 | 00 | 00 |
| 000112 | 00 | 00 | 00 | 00 | 00 | 00 | 00 | 00 | 00 | 00 | 00 | 00 | 00 | 00 | 00 | 00 |
| 000128 | 00 | 00 | 00 | 00 | 00 | 00 | 00 | 00 | 00 | 00 | 0C | 0B | 5C | 34 | 01 | 00 |
| 000144 | 00 | 00 | 41 | 72 | 63 | 61 | 64 | 61 | 20 | 53 | 6F | 66 | 74 | 77 | 61 | 72 |
| 000160 | 65 | 2C | 20 | 49 | 6E | 63 | 2E | 20 | 20 | 20 | 20 | 20 | 20 | 20 | 20 | 20 |
| 000176 | 20 | 20 | 20 | 20 | 20 | 20 | 20 | 20 | 20 | 20 | 20 | 20 | 20 | 20 | 55 | 73 |
| 000192 | 65 | 72 | 20 | 46 | 6F | 72 | 6D | 61 | 74 | 74 | 65 | 64 | 2C | 20 | 51 | 49 |
| 000208 | 43 | 33 | 30 | 32 | 30 | 20 | 72 | 65 | 76 | 20 | 42 | 2C | 20 | 4D | 61 | 6E |
| 000224 | 75 | 20 | 30 | 37 | 2E | 00 | 55 | 73 | 65 | 20 | 00 | 00 | 00 | 00 | 00 | 00 |
| 000240 | 00 | 00 | 00 | 00 | 00 | 00 | 00 | 00 | 00 | 00 | 00 | 00 | 00 | 00 | 00 | 00 |

Start of Bad Sector Map for Ditto 5000 tape
*******************************************

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 000256 | 08 | FC | 01 | B0 | 5F | 04 | 6E | 5E | 07 | 54 | 14 | 0B | F6 | FD | 0C | 0E |
| 000272 | 0F | 10 | 11 | 12 | 13 | 14 | 15 | 16 | 17 | 18 | 19 | 1A | 1B | 1C | 1D | 1E |
| 000288 | 1F | 20 | 21 | 22 | 23 | 24 | 25 | 26 | 27 | 28 | 29 | 2A | 2B | 2C | 2D | 2E |
| 000304 | 2F | 30 | 31 | 32 | 33 | 34 | 35 | 36 | 37 | 38 | 39 | 3A | 3B | 3C | 3D | 3E |
| 000320 | 3F | 40 | 41 | 42 | 43 | 44 | 45 | 46 | 47 | 48 | 49 | 4A | 4B | 4C | 4D | 4E |
| 000336 | 4F | 50 | 51 | 52 | 53 | 54 | 55 | 56 | 57 | 58 | 59 | 5A | 5B | 5C | 5D | 5E |
| 000352 | 5F | 60 | 61 | 62 | 63 | 64 | 65 | 66 | 67 | 68 | 69 | 6A | 6B | 6C | 6D | 6E |
| 000368 | 6F | 70 | 71 | 72 | 73 | 74 | 75 | 76 | 77 | 78 | 79 | 7A | 7B | 7C | 7D | 7E |
| 000384 | 7F | 80 | 81 | 82 | 83 | 84 | 85 | 86 | 87 | 88 | 89 | 8A | 8B | 8C | 8D | 8E |
| 000400 | 8F | 90 | 91 | 92 | 93 | 94 | 95 | 96 | 97 | 98 | 99 | 9A | 9B | 9C | 9D | 9E |
| 000416 | 9F | A0 | A1 | A2 | A3 | A4 | A5 | A6 | A7 | A8 | A9 | AA | AB | AC | AD | AE |
| 000432 | AF | B0 | B1 | B2 | B3 | B4 | B5 | B6 | B7 | B8 | B9 | BA | BB | BC | BD | BE |
| 000464 | BF | C0 | C1 | C2 | C3 | C4 | C5 | C6 | C7 | C8 | C9 | CA | CB | CC | CD | CE |
| 000480 | CF | D0 | D1 | D2 | D3 | D4 | D5 | D6 | D7 | D8 | D9 | DA | DB | DC | DD | DE |
| 000496 | EF | F0 | F1 | F2 | F3 | F4 | F5 | F6 | F7 | F8 | F9 | FA | FB | FC | FD | FE |

Bad Sector Map continues up to byte 29440

FIG. 11

WRITING AND READING HIGH DENSITY MAGNETIC TAPES

FIELD OF THE INVENTION

This invention relates to a magnetic tape drive system and to a new format for a magnetic tape in which data can be written in a very high density.

BACKGROUND OF THE INVENTION

U.S. Pat. No. 5,210,664 Perona shows a drive for the mini data cartridge containing magnetic tape which stores computer data. Small tape drives for writing and reading data stored on ¼" tape in these mini cartridges are commonly used in personal computer systems.

U.S. Pat. No. 5,268,802 Bar—Reading Non-Standard Tapes on Tape Drives relates to drives which read tape in the QIC format, and which also read tapes written in another, non-standard, format.

Quarter-Inch Cartridge Drive Standards Inc. 311 East Carillo Street, Santa Barbara, Calif. 93101 publishes development standards adopted by several manufacturers for this type of tape drive.

QIC-3020-MC Revision G, 1 Sep. 1995 SERIAL RECORDED MAGNETIC TAPE MINI CARTRIDGE FOR INFORMATION INTERCHANGE contains the development standard for a tape drive which writes and reads tapes referred to as Travan, in this case, Travan III or TR3. Using these tape cartridges, the drive is capable of recording 1.6 GB of data.

It is an object of the present invention to provide a magnetic tape drive, and a magnetic tape format in which an increased amount of data, for example 2.5 GB, can be recorded in a cartridge having the same physical characteristics. The tape drive of the present invention must distinguish between cartridges formatted in the new, high density format, and the standard, lower density format. This distinction cannot be made based on the physical characteristics of the cartridge as has usually been done in common practice. Also, the distinction cannot be made reliably based on the frequency of reference bursts and the distance between them, as in the QIC3020 drives. Because the physical characteristics of the cartridges are the same, and the frequency of the bursts is the same, and distance between bursts is close, the formats must be uniquely distinguished by the drive to prevent a tape recorded in the new, high density format from being written on by a drive which does not have the capability for operating in the high density format. Otherwise, important data on the high density tape may be lost. A tape formatted with the high density format may be ruined.

SUMMARY OF THE INVENTION

In accordance with the present invention, a format for storing an increased amount of data on magnetic tapes has overlapping tracks of data extending longitudinally of the tape. For example, the tape format of the present invention allows a user to back up 2.5 GB of uncompressed data as compared to a TR-3 type tape using the QIC-3020 format which can store 1.6 GB of uncompressed data.

The tape is written in overlapping tracks of data extending longitudinally of the tape. By overlapping, 60 tracks of data, for example, are recorded across the tape instead of 50 tracks in the QIC-3020 format. (Or 48 tracks are recorded instead of 40 tracks for the narrow tape version of QIC-3020.) A center portion of each track, 5 mils in the example, does not have overlap. This center portion of each track can be read by the wide write/narrow read heads of a tape drive because the center portion is wider than the narrow read heads of the drive. For example, drives which can read 3020 formatted tape have write heads which are 6 mils wide and read heads which are 2 mils wide. The 2 mils read heads read the 5 mils center portion of the tape reliably without interference from the overlapped portion of the track.

The magnetic tape drive of the present invention can read/write tapes written in the standard low density format (i.e. QIC3020) or in the increased data storage format of the present invention. In order to distinguish between a tape written in a standard format and a tape written in the increased data storage format, distinctions in the formats are detected by the drives. Systems not having the capability for operating in the new, high density format are prevented from operating on tapes recorded in this format.

In the new format, an identifying reference burst is recorded in a longitudinal track near the center of a tape (track zero) written in the increased density format. A tape drive in accordance with the present invention has means for detecting the identifying reference burst near the center of the tape, i.e. track zero. Detection of the identifying reference burst on track zero identifies the tape as one written in a format which stores the increased amount of data. Because the identifying reference burst is the same frequency, but in a different location, as reference bursts on the standard tape, a more reliable format distinction is employed.

In the QIC3020 format, upper and lower reference bursts are recorded in the load zone on either side of track zero. In the format in accordance with the present invention, a reference burst is recorded near the center of tape (track zero) to identify the new format. However, this reference burst is the same frequency as the QIC3020 reference burst, and it is close to the same location.

In accordance with the invention, the drive is prevented from writing on a tape written in the new format because the bad sector map is encrypted. In accordance with QIC standards, each tape has a bad sector map which identifies all the bad sectors of the tape upon which the drive should not operate. The data on tape cannot be retrieved or recorded until this bad sector map has been read and the drive and software set accordingly. By encrypting the bad sector map in tapes having the high density format, drives which do not have high density capability will never be enabled to operate on high density tapes.

The foregoing and other objects, features and advantages of the invention will be better understood from the following more detail description and appended claims.

SHORT DESCRIPTION OF THE DRAWINGS

FIG. 10 shows a bad sector map in a normal QIC 3020 tape header;

FIG. 11 shows an encrypted bad sector map in a header in accordance with the present invention.

Description of the Preferred Embodiment

Figure 1:
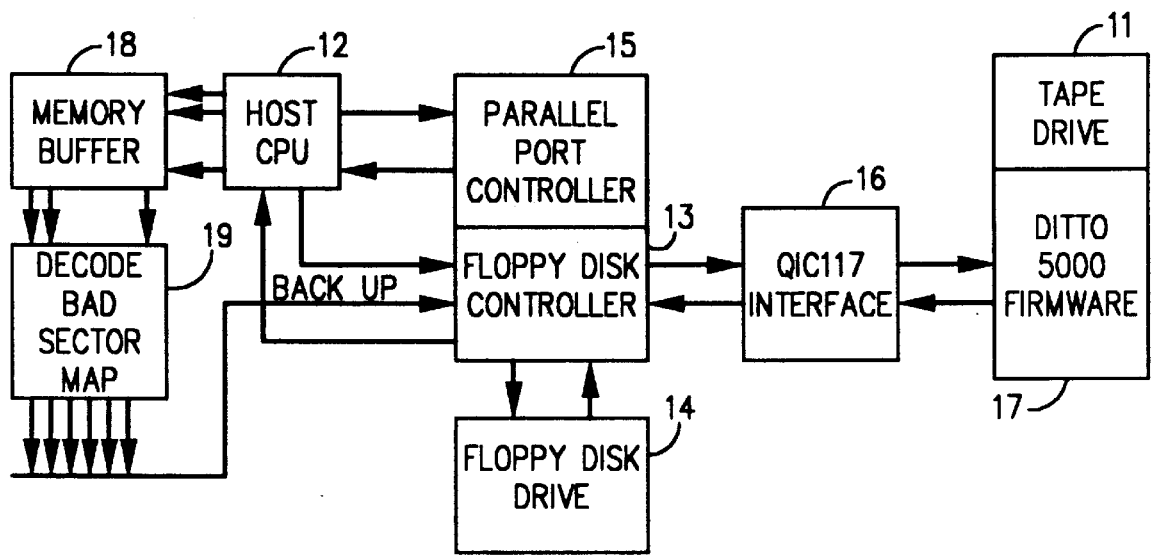
FIG. 1 is a block diagram showing the tape drive of the present invention configured in a computer system and the firmware and the interface for a tape drive in which the present invention is incorporated.

FIG. 1 shows the tape system in accordance with the present invention. A tape drive 11 is connected in a typical configuration of a personal computer system. The system includes a host computer 12 and a controller 13.

Controller 13 is typically capable of operating peripherals, such as the floppy disk drive 14. A parallel port controller 15 is also provided. The controller 13 is connected to tape drive 11 through an interface 16. In the example under consideration, the interface 17 is specified by the aforementioned QIC117 standards. Tape drive 11 has firmware 17 which performs the operations required to meet the aforementioned QIC117 standards. In accordance with the present invention, the software in host CPU 12 transfers the header of a tape in drive 11 to the memory buffer 18. The software has the capability 19 to decrypt the bad sector map. If the software does not have this capability, the software will not be able to operate on high density tapes. In this case, most sectors will be indicated as being bad and the software will not be able to perform operations on the tape.

Figure 2:
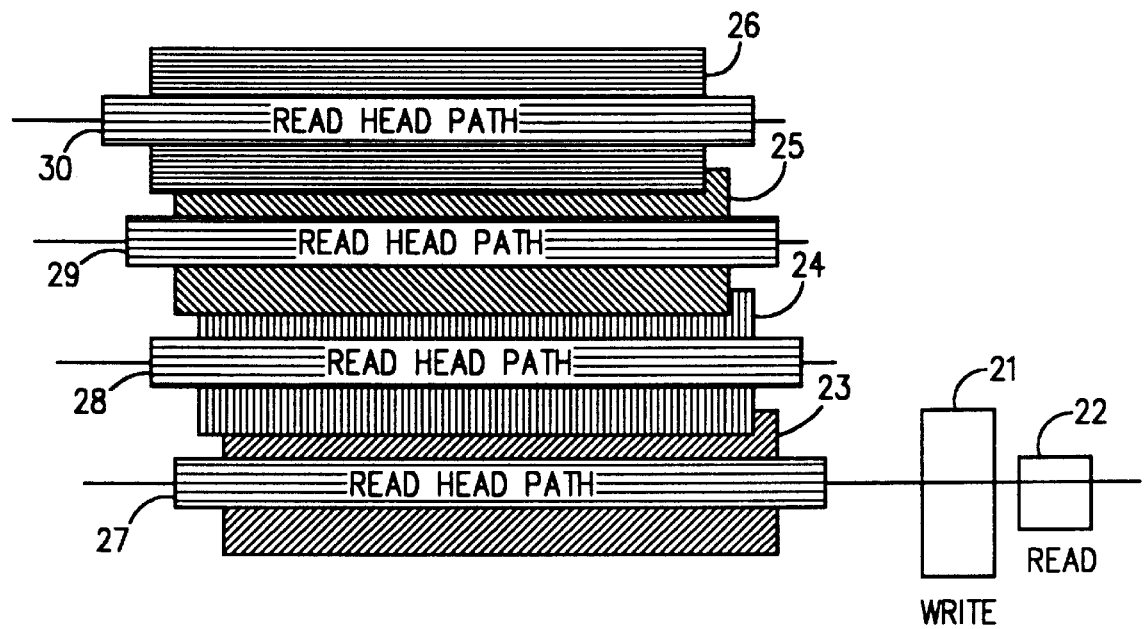
FIG. 2 depicts the wide write/narrow read heads of the drives of the present invention and depicts the read head path and the write head path for several tracks.

FIG. 2 shows how the tracks are overlapped using the new format. A wide write head 21 writes, and a narrow read head 22 reads, these tracks of data. The read head has 1 mil of tolerance above it, and 2 mils under it (on even tracks). Wide write head 21 writes the tracks of data 23, 24, 25 and 26 which extend longitudinally of the tape. A center portion 27–30 of each track does not overlap another track. This center portion is wider than the narrow read head 22. This format of overlapping tracks is capable of writing an increased amount of data, for example, 2.5 GB of uncompressed data as compared to 1.6 GB of uncompressed data with the QIC3020 format.

Figure 3:
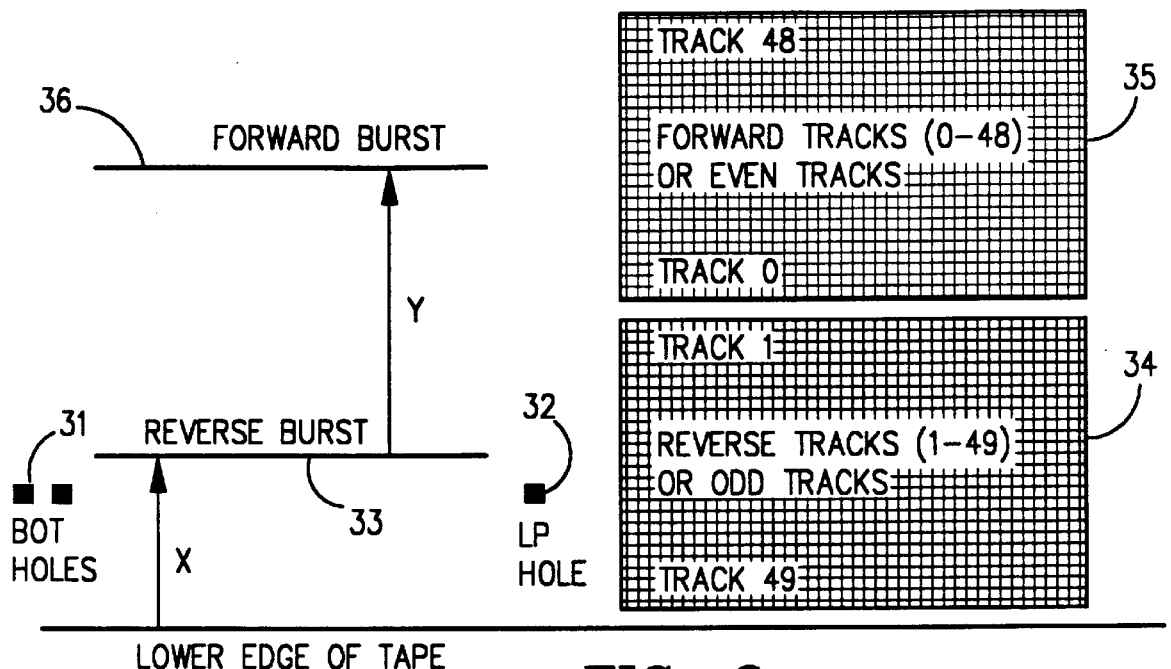
FIG. 3 depicts the format of a QIC-3020 tape.

FIG. 3 depicts the format of a standard QIC3020 tape. The load zone portion of the tape has beginning of tape (BOT) holes 31 and a load position (LP) hole 32. A reference burst 33 identifies the reverse, or odd, tracks 34. The reverse reference burst 33 center line is located 0.1185±0.0011 inch (3.0099±0.0279 mm) below the forward reference burst center line and written at the BOT end of tape in the reverse direction. This reverse reference burst is a distance x from the lower edge of the tape. Both of these are specified for QIC3020 wide/narrow tapes. The forward, or even tracks 35 are identified by a forward reference burst 36 in the load zone of the tape. This forward reference burst is a distance y from the reverse reference burst 33. The forward reference burst 36 center line is located 0.05925±0.0011 inch (1.50495±0.0279 mm) above the tape center line and written at the BOT end of tape in the forward direction. Again, both are specified for QIC3020 wide/narrow tapes.

Figure 4:
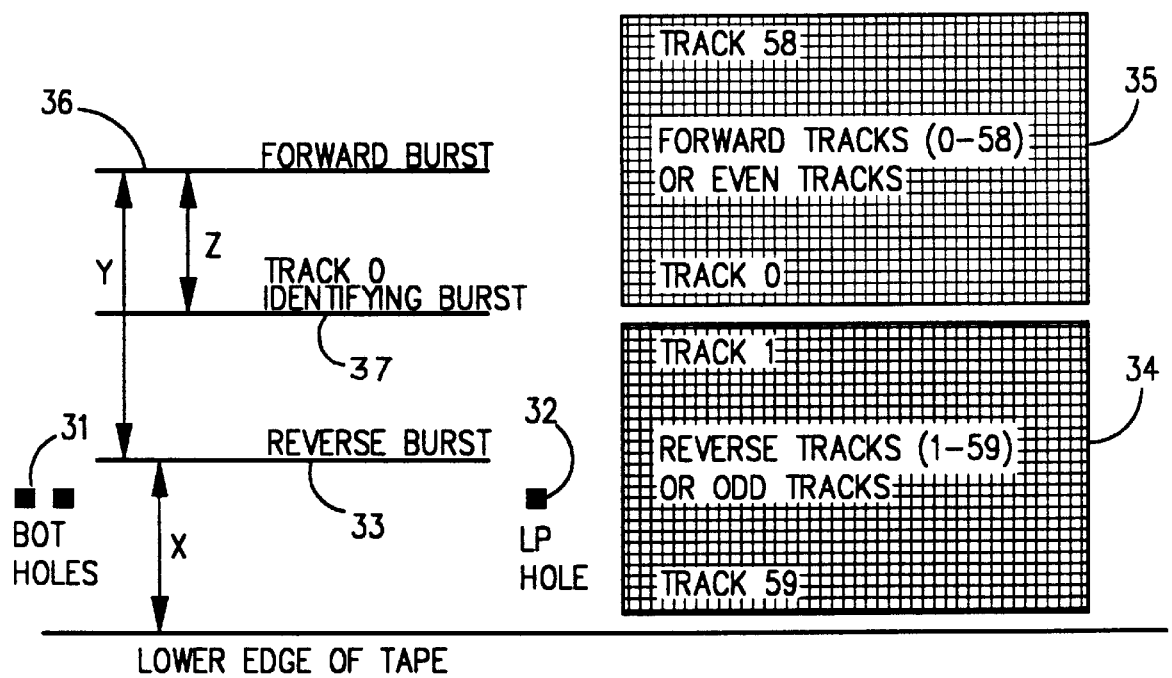
FIG. 4 depicts the format of a tape of the present invention.

As shown in FIG. 4, a track zero identifying burst 37 identifies a tape having the format of the present invention which stores an increased amount of data. The identifying burst 37 is recorded in the same position as track zero in the load zone between the BOT 31 and the load point holes 32. The forward tracks 35 are referenced to the forward burst 36. The reverse tracks 34 are referenced to the reverse burst 33. The identifying burst 37 is used for identification purposes. The Ditto 5000 identifying burst. 37 center line is located at the same position as track zero and is used to identify the Ditto 5000 format. The identifying burst is written at the BOT end of tape in the forward direction. The lowest forward track is track zero and the highest forward track is track 58 (using wide tape). The highest reverse track is track 1, and the lowest is track 59 (using wide tape). The increased data format is distinguished from the standard, i.e. QIC3020 format, by a reference burst 37 at track zero as shown in FIG. 4.

Figure 5:
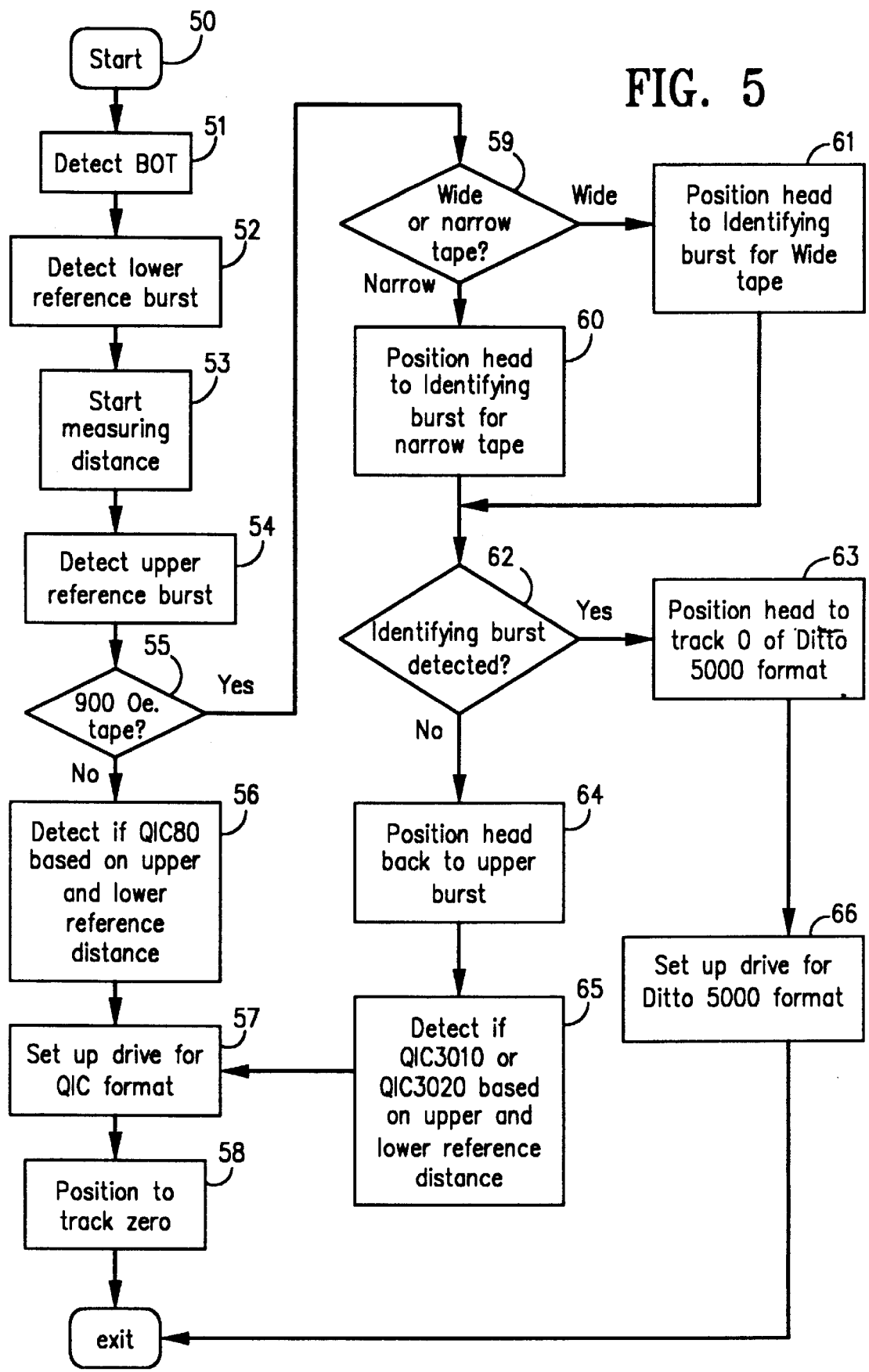
FIG. 5 depicts the operation of the drive software in distinguishing the new format of the present invention from that of a prior art drive.

FIG. 5 depicts the operation of the firmware 17 of the present invention in distinguishing between the new format and any other standard format. This firmware 17 resides in the tape drive 11 and operates between host CPU 12, floppy disk controller 13, QIC117 interface 16 and the Ditto 5000 firmware 17. As used herein, Ditto 5000 firmware is the firmware used to write data in the high density format of the present invention. Ditto 5000 denotes the drives of the present invention and the tapes of the present invention.

FIG. 5 shows the manner in which the firmware in the drive 17 identifies a tape having the Ditto 5000 format. Systems which do not have the capability of operating in the Ditto 5000 format cannot read/write tapes which have been recorded in that format.

The Ditto 5000 firmware 17 determines if the cartridge has tapes with a coercivity of 900 OE (oersteard) or 550 oe. It will determine if the format on the tape is QIC80, QIC3010, QIC3020, or Ditto 5000. The QIC80 format can be written on 550 Oe. tape only. The firmware then makes a determination if the 900 Oe. tape is wide or narrow, and positions the head from the upper burst to the Identifying burst. If the Identifying burst exists, the tape is Ditto 5000. If no Identifying burst is found, the head is positioned back to the upper reference burst and the firmware determines QIC3010, or QIC3020 based on the reference burst distance.

This is shown more specifically in FIG. 5. Following the start 50, the beginning of tape is detected at 51. 900 OE or 550 OE is determined here. This is based on tape holes 10 and distance. Then, the lower reference burst 33 is detected as indicated at 52. As the tape head moves toward the upper edge of the tape, the distance is measured, step 53. The upper reference burst 36 is detected. If the tape is 900 OE (step 55), the firmware looks at formats written on 900 OE tapes (QIC3010, QIC3020, Ditto 5000). If the tape is 550 OE (step 55), the firmware looks at formats written on 550 OE tapes (QIC80). Based on the upper and lower reference distance, a determination is made that it is a QIC80 tape as indicated 56. The drive is set up to read the QIC format as indicated at 57 and the head is positioned to track zero as indicated at 58.

Returning to the step 55, if the tape is 900 Oe. tape, a determination is made as to whether it is a wide or a narrow tape as indicated at 59. If a narrow tape is detected, the head is positioned to the identifying burst for narrow tape as indicated at 60. If wide tape is detected, the head is positioned to the identifying burst or wide tape as indicated at 61. The track identifying burst 37 (FIG. 4) is identified as indicated at 62. If identified, the head is positioned to track zero of the Ditto 5000 format as indicated at 63. If not, the head is positioned back to the upper reference burst 36 as indicated at 64. A determination is made that the tape is a QIC3010 or QIC3020 based on the upper and lower reference burst distances as indicated at 65. If a reference burst at track zero has been detected during the performance of the step 62 and 63, then the drive is set up for the Ditto 5000 format as indicated at 66 and the firmware exits from this routine.

It is important to note, that the distance between the upper and lower bursts is used by the drive for switching between odd and even tracks. This is done to compensate between drive to drive tolerances.

Figure 6:
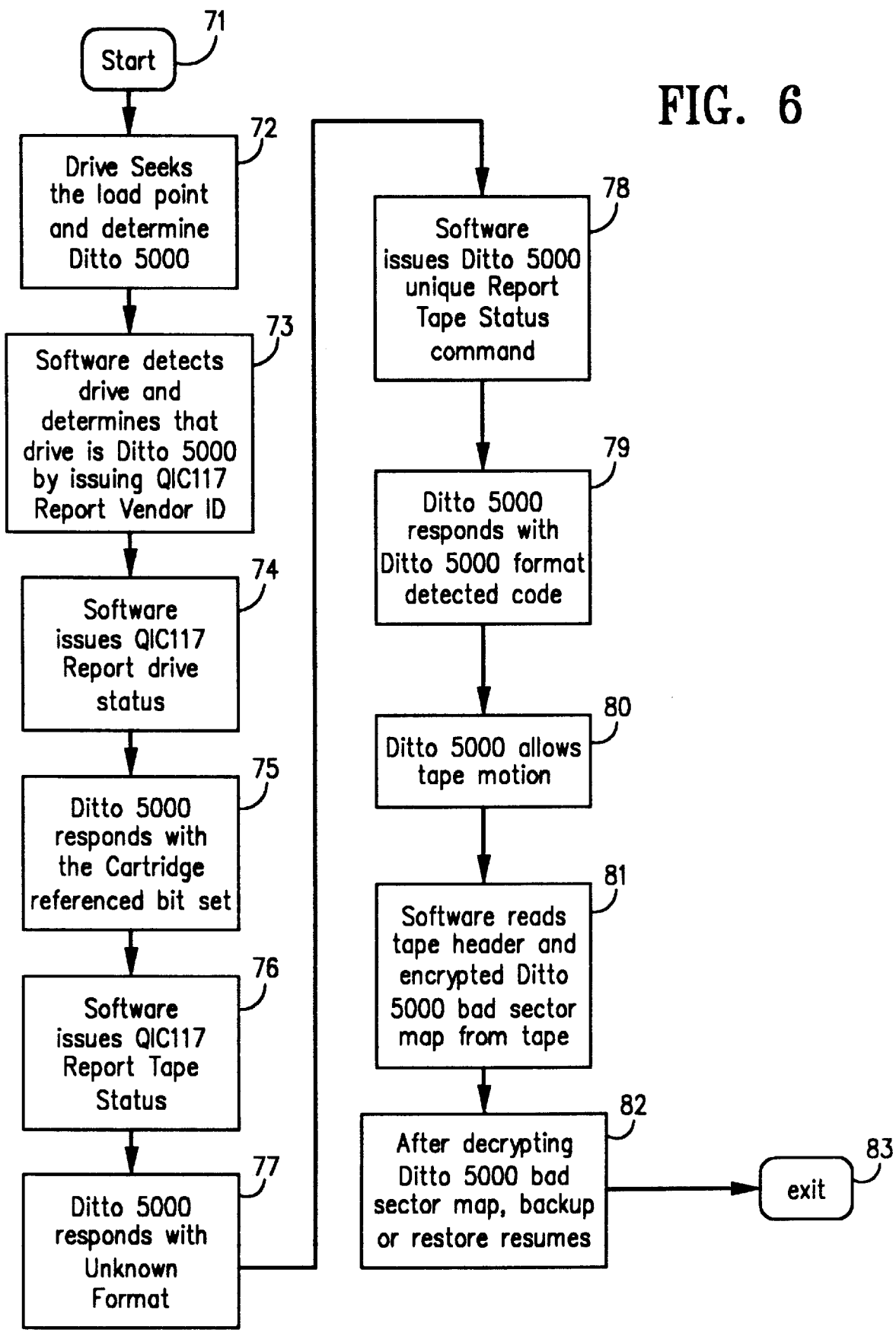
FIG. 6 depicts a backup or restore operation on a drive of the present invention operating on a tape formatted in accordance with the present invention.

FIG. 6 depicts a backup or a restore operation on tapes formatted in accordance with the present invention, i.e. a Ditto 5000 formatted tape. The process of backing up or restoring data using the Ditto 5000 format protects against a CPU with unqualified software, or an unqualified drive from using the Ditto 5000 tape and potentially ruining the user data stored on the tape.

The process in the flow chart of FIG. 6 describes the interface between the user software in CPU 12 and the Ditto 5000 drive firmware 17. Normal QIC117 commands are used up to the point at which the software needs to identify the format on tape.

Starting at 71, the drive seeks the load point to determine if a Ditto 5000 formatted tape is present as indicated at 72. The software in host computer 12 detects the drive 11 and determines that the drive is a Ditto 5000 drive. The drive issues a QIC117 report vendor command which identifies the drive as indicated at 73. The software in host computer 12 issues a QIC117 Report Drive Status command as indicated at 74. The tape drive 11 and the firmware 17 responds with the cartridge referenced bit set as indicated at 75. This indicates that the cartridge is formatted and there is data on tape.

The software in the host computer 12 issues a QIC117 Report Tape Status command, as indicated at 76. All commands up to this point are standard QIC117 commands.

At the step 77, the Ditto 5000 firmware 17 responds by reporting an "unknown tape format" to the software. The Ditto 5000 firmware 17 also reports that the cartridge is formatted by setting the Cartridge Reference flag. At this point, unqualified software in CPU 12 reports to the user that the tape is unreadable.

Qualified Ditto 5000 software issues a unique Report Tape Status Command. For example, this can be diagnostic No. 1 command in the QIC117 vendor unique commands. The Ditto 5000 firmware 17 responds at this point with the step 79 reporting Ditto 5000 detected, which, for example, can be code No. 28 in the QIC117 format, or the firmware 17 responds with an unknown format, i.e. a code of zero, in case the tape is truly unknown. (This is the same as in the standard QIC3020.) The tape drive in accordance with the present invention will not allow tape motion, enabling the software to read and write a tape, unless the steps 78 and 79 are followed. This further protects user data against unqualified software interfacing with a tape drive in accordance with the present invention. Tape motion commences as indicated at 80. The software in host computer 12 reads the tape header and the encrypted Ditto 5000 bad sector map from the tape as indicated at 81. The backup or restore operation is resumed. The bad sector map is decrypted as indicated at 82, and an exit is made at 83.

The backup or restore operation resumes in accordance with standard QIC117 procedures. Note that unqualified software which cannot decrypt the bad sector map would operate on the assumption that most of the sectors on the tape are bad. This protects recorded user data against unqualified software or an unqualified drive from operating on the data.

Figure 7:
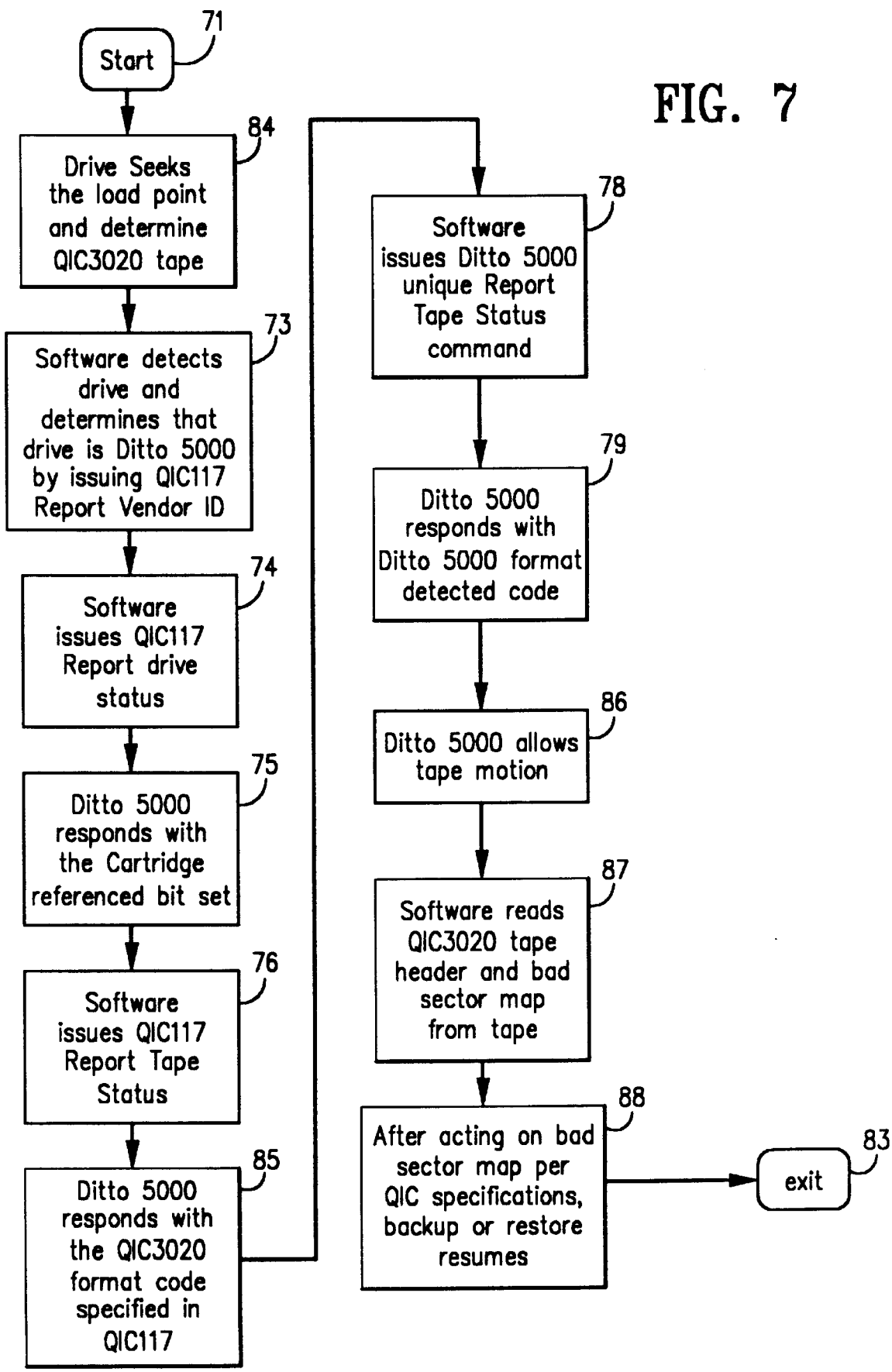
FIG. 7 depicts a backup or restore operation on a tape drive of the present invention operating on a standard formatted tape.

FIG. 7 shows the process of backing up or restoring using a QIC3020 preformatted tape on a tape drive of the present invention. The process is essentially the same as on any tape drive complying with the QIC117 specifications. Steps which are like those in FIG. 6 bear like reference numerals. The steps that are shadowed show the differences between the drive of the present invention and a drive with standard QIC3020 software and drive firmware. At the step 84, the absence of a reference burst in track zero distinguishes a QIC3020 tape from the Ditto 5000 tape. The operation is the same up to step 85 where the software tries to identify the tape format. The firmware 17 of the present invention responds, per QIC117 specifications, with the correct response for a QIC3020 tape. The software continues with step 86 in which the firmware 17 and drive 11 allows tape motion. The normal QIC tape header is read as indicated at 87. The unencrypted bad sector map is read and acted upon in accordance with QIC specifications. A backup or restore operation resumes, as indicated at 88.

The tape drive of the present invention enables any software complying with QIC117 standards to operate normally with any TR3 or QIC tape since the process for identifying the tape and reading the tape header does not change.

Figure 8:
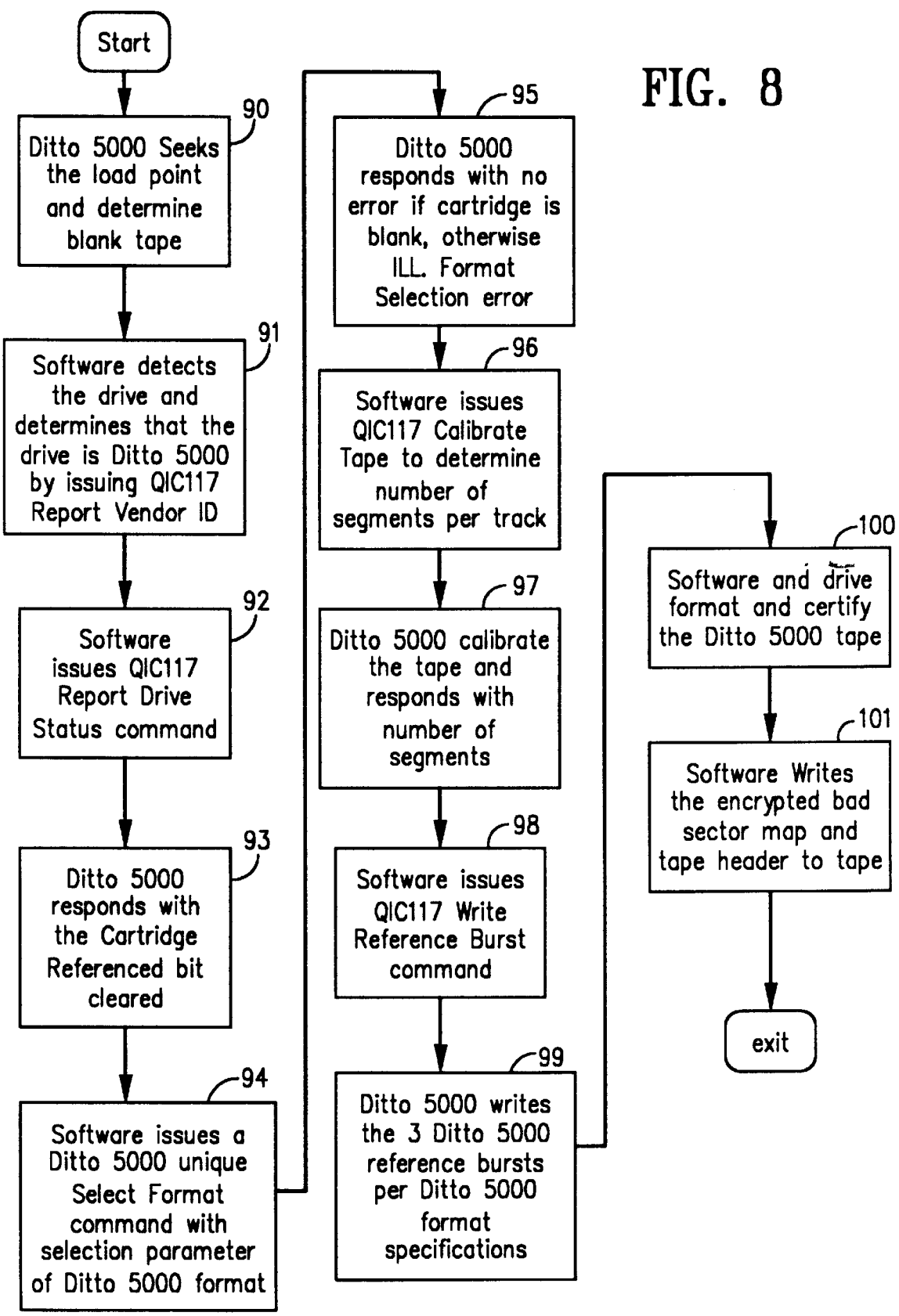
FIG. 8 depicts the operation of formatting a tape in accordance with the present invention.

FIG. 8 shows how Ditto 5000 tapes in accordance with the present invention are formatted in a formatting house. The present invention protects against variations in the format and protects against unqualified drives and software from formatting the tape. The tape which can later be used in the field on a drive in accordance with the present invention for backup or restore operation must conform in all respects to the Ditto 5000 format specifications including track position, electrical characteristics of the recording drive, media and other specifications. Because of these considerations, a tape in accordance with the present invention cannot be formatted by the user. The tape must be formatted by qualified software. Another reason that tapes cannot be formatted by the user is that formatting requires a large amount of time, approximately twelve hours, in accordance with the present invention. FIG. 8 is a flow chart which describes how formatting software and a formatting drive interact during the formatting process of the Ditto 5000 tape. After start, at step 90 the firmware seeks the load point and determines that the tape is blank. This is determined by the occurrence of no reference bursts in the load zone.

At step 91, the software detects the type of drive and determines that the drive is Ditto 5000 by issuing a QIC117 Report Vendor I.D. command. The software issues a QIC117 Report Drive Status command as indicated at 92. This as indicated at 93, the Ditto 5000 firmware responds with the Cartridge Referenced bit cleared. As indicated at 94, the software issues a unique Ditto unique Select Format command with selection parameter of the Ditto 5000 format. This selects the Ditto 5000 format i.e., the format of this invention. This is done to ensure that the formatting drive and software are qualified. If the software does not issue a Select Format command, the Ditto 5000 drive defaults to QIC3020.

In step 95 the Ditto 5000 responds with no error if the cartridge is blank. Otherwise, ILL format selection error is issued. Step 95, as well as step 94, is performed to ensure that the tape is formatted by qualified software. If the drive is not a qualified formatting drive, the software would be prompted with an error indication.

At step 96, the software resumes in accordance with the QIC117 specifications by calibrating the tape in order to fetch the number of segments per track. The Ditto 5000 calibrates the tape and responds with the number of segments as indicated at 97. In step 98 the software issues the QIC117 Write reference burst command. In step 99, the Ditto 5000 writes three reference bursts in accordance with the Ditto 5000 format specifications. After the reference bursts are written at step 99, the software and drive format of the tape certify that it is a Ditto 5000 tape in the step 100. The format operation is concluded by writing an encrypted bad sector map and tape header to the tape in the step 101.

Figure 9:
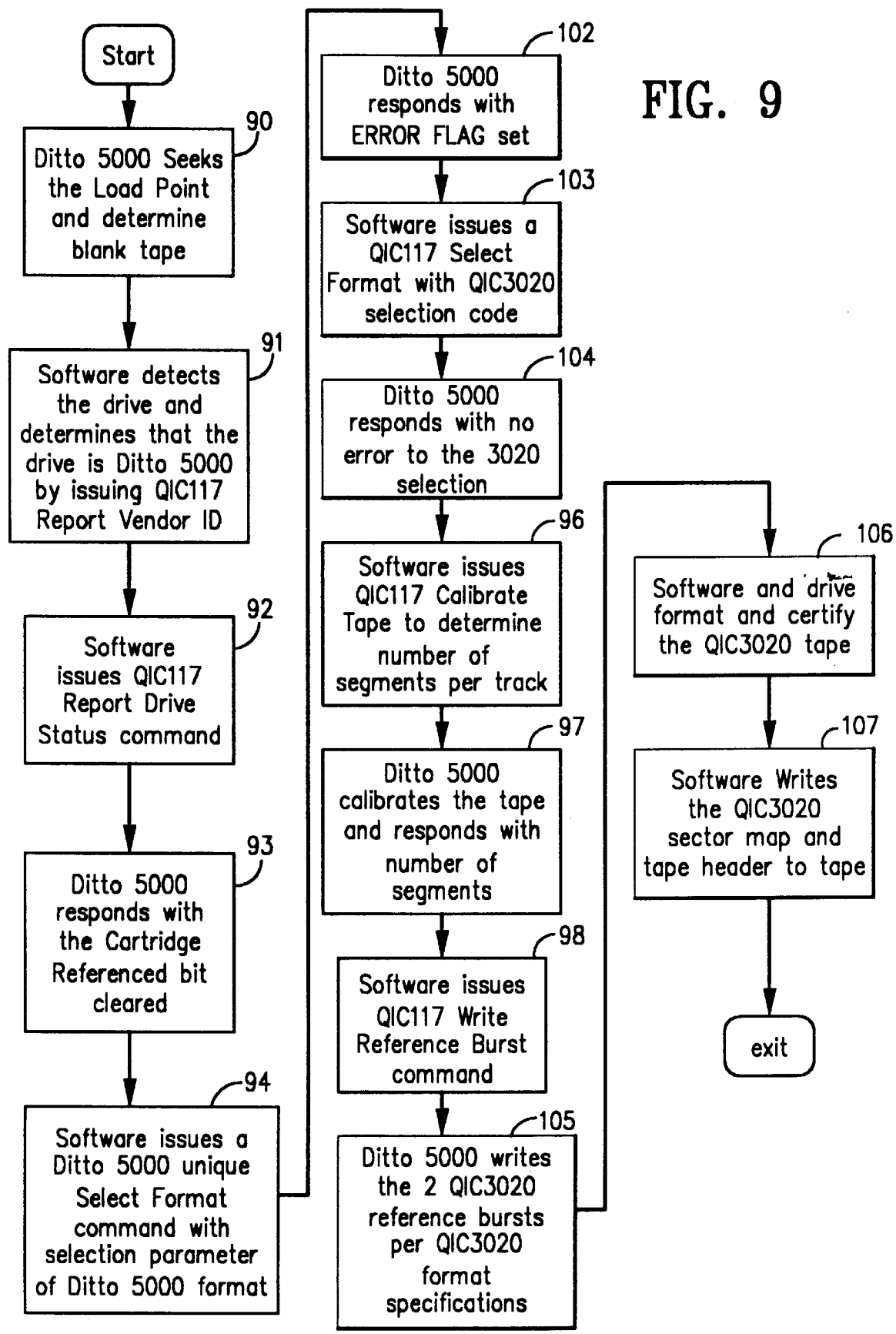
FIG. 9 depicts how a tape is formatted in accordance with the prior art.

For comparison, FIG. 9 shows how a tape drive in accordance with the present invention would format a standard tape, i.e. a QIC3020 tape, in the field by the user. Steps 90–94 are the same as in FIG. 8. In this case, the drive of the present invention responds with AN ERROR FLAG set as indicated at 102. An error message is sent in reply to a Ditto 5000 format selection. This error message indicates that the drive is not capable of formatting tapes with the format of this invention. The software for the CPU in the field does not give the user the option to format a Ditto 5000 tape. Therefore, the steps 94, 102 and 103 are shown in case other software attempt 20 this operation. If the software does not issue a Select Format command at step 103, the Ditto 5000 user drive defaults to QIC3020 or another, different, format is selected.

In step 104, the drive responds to QIC3020 format selection only and resumes the rest of the format operations of the QIC3020 specification. Steps 96–98 are performed. The drive writes the two QIC3020 reference bursts as indicated at 105 and certifies the tape as being a QIC3020 tape as indicated at 106. The software writes a standard QIC3020 sector map and tape header to the tape as indicated at 107.

FIG. 10 shows a normal QIC3020 tape header and bad sector map. The first column on the left is the byte count. The succeeding sixteen columns are the bytes, two bits to a byte. The tape information is from byte count 000000 through 000240. This information includes the date formatted, the time formatted and a description of the formatting. A tape header is described more fully on page 26 of the QIC3020 specification.

The first bad sector starts at byte count 000256. The bad sector map includes all the bytes from byte count 000256 through byte count 29440 and the next fifteen bytes, i.e. up to where the ECC starts. Every three bytes describes the address of a bad sector. For example, the address of the first bad sector is F7 04 00. The next bad sector is 52 A4 00. The next is 97 A8 00, and so on.

When the user puts this tape into the drive, the addresses of these sectors are stored and thereafter these sectors are not used for reading and writing.

An example of an encrypted header and bad sector map is shown in FIG. 11. FIG. 11 shows a header and bad sector map which has been encrypted by one of a number of usable processes.

Figure 12:
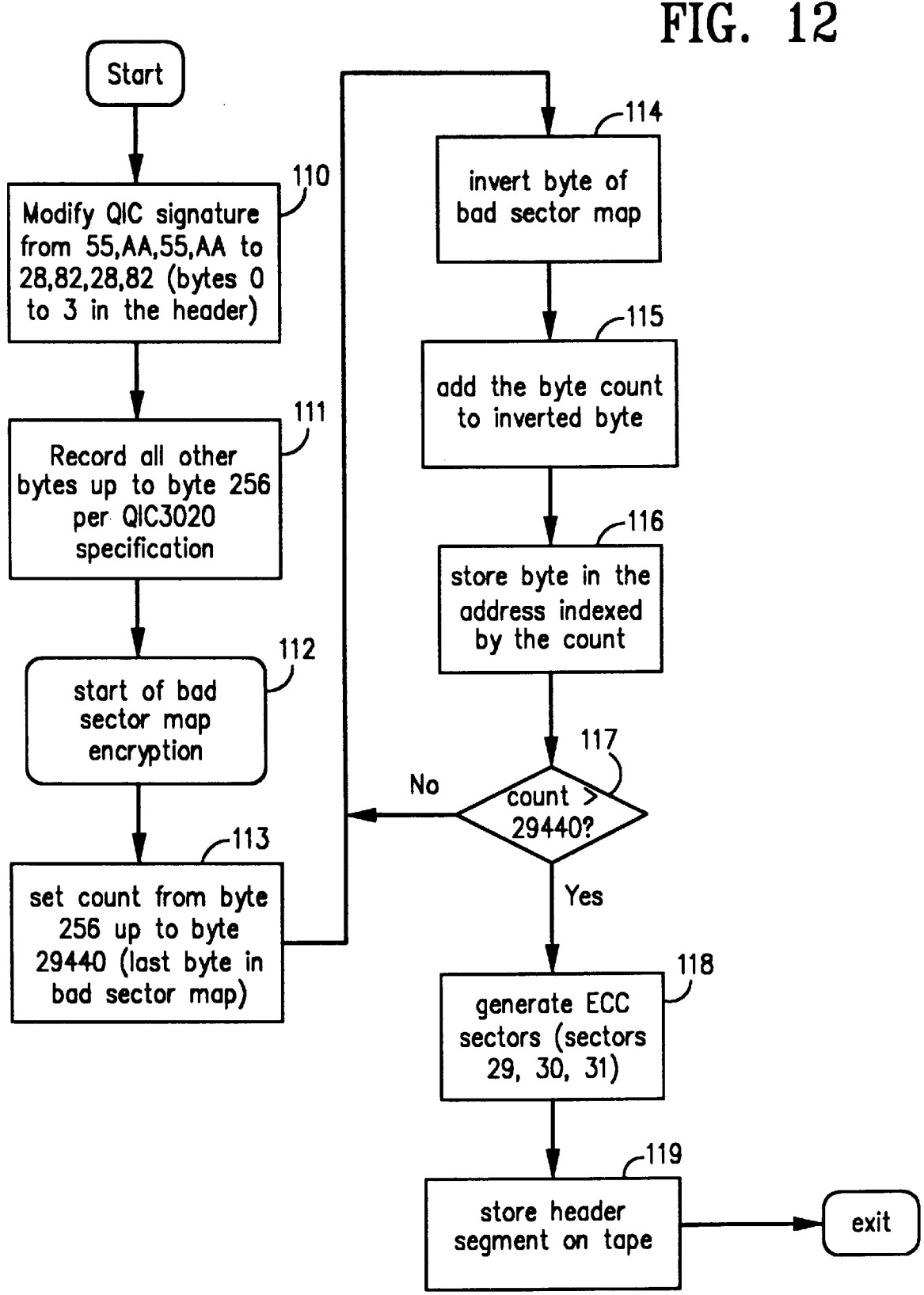
FIG. 12 shows how the header including the bad sector map is encrypted.

An example of an encryption technique is shown in FIG. 12. It has been used to encrypt the header of FIG. 10 to the header of FIG. 11.

After start, the QIC signature is modified by step 110. In the example under consideration, the QIC signature is modified from AA, 55, AA, 55, to 28, 82, 28, 82. In the header of FIGS. 10 and 11 these are the bytes designated byte count 0 through byte count 3. The modification of the QIC signature in the tape header accomplishes two purposes. It allows the backup software to distinguish between a QIC3020 header and a Ditto 5000 header. Also, unqualified software will reject a tape header that does not have a QIC signature of 55, AA, 55, AA. In the step 111, remaining header information from byte count 4 through byte count 255 are written in accordance with the QIC3020 specifications.

Step 112 starts the bad sector map encryption. The encryption in this example inverts the byte and adds the counts (offset) to the byte before storing it in the buffer. Step 113 sets the count from byte 256 up to byte 29440, which is the last byte in the bad sector map.

In step 114, each byte of the bad sector map is inverted. The byte count is added to the inverted byte in step 115. The bad sector map in the examples of FIGS. 10 and 11 contains 5 bad sectors—0004F7, 00A452, 00A897, 00F5B4 and 010F15. These bad sector numbers are converted after the encryption to 01FC08, 045FB0, 075E6E, 0B1454 and 0DFDF6. The rest of the map of FIG. 10 contains zeros (no bad sectors), but after encryption to FIG. 11 causes the software to think that many more sectors are bad. In the example up to 512 bytes are included, but the rest of the header segment is encrypted the same way (up to byte 29440).

In step 116, each byte is stored in the address indexed by the count.

At 117, if the count is not greater than 29440, the loop 114–115 is repeated. If it is, the ECC sectors are generated as indicated at 118, and the header is stored on tape as indicated at 119.

The present invention is not limited to the particular embodiments disclosed, but is intended to cover all modifications that are within the spirit and scope of the invention as defined by the appended claims.

What is claimed is:

1. A format for storing an increased amount of data on magnetic tape, said data being written/read in a tape drive of the type having wide write/narrow read heads, said format comprising:

tracks of data extending longitudinally of said tape written by said wide write heads so that a center portion of each track, which does not overlap another track, is wider than said narrow read heads, means in said format for identifying a tape written in said format; said means including:

a header having an encrypted bad sector map identifying unusable sectors on said tracks of data.

2. The format recited in claim 1 wherein said means comprises:

a reference burst in a longitudinal track near the center of said tape, said reference burst identifying said tape as having said format for storing an increased amount of data.

3. The format recited in claim 1 including a header having a signature indicative of the format of the tape and wherein said means for identifying includes an altered signature.

4. The format recited in claim 1 wherein said tracks of data are overlapping.

5. A tape drive for writing/reading magnetic tape with data, said data being stored in a format having an increased amount of data, said drive comprising:

a wide write/narrow read head for writing data in tracks extending longitudinally of said tape, said tracks of data being written by said wide write heads so that a center portion of each track, which does not overlap another track, is wider than said narrow read heads, means for distinguishing said format having an increased amount of data from other formats to enable said drive to operate on said tape; and means for decoding an encrypted bad sector map to enable said drive only if said bad sector map has been decoded.

6. The tape drive recited in claim 5 wherein said means for distinguishing comprises:

means for detecting a reference burst in a longitudinal track near the center of said tape to identify said tape as having said format for storing an increased amount of data.

7. The tape drive recited in claim 5 wherein said means for distinguishing comprises:

means for identifying an altered signature in the tape header.

8. The tape drive system recited in claim 5 further comprising:

a buffer for storing a header read from said tape, said header having a bad sector map, said map having the addresses of all sectors on said tape which are unusable.

9. The tape drive recited in claim 5 wherein said tracks are overlapping tracks of data.

10. A method of formatting tape for storing an increased amount of data on magnetic tape, said data being written/read in a tape drive system of the type having wide write/narrow read heads, the format of said tape having tracks of data extending longitudinally of said tape written by said wide write heads so that a center portion of each track, which does not overlap another track, is wider than said narrow read heads, said method of formatting comprising:

writing a reference burst in a longitudinal track near the center of said tape, said reference burst identifying said tape as having said format for storing an increased amount of data;

writing a header on said tape including the address of bad sectors;

encrypting the address of bad sectors on said tape; and writing the encrypted addresses of bad sectors in a map in the header of said tape.

11. The method of formatting recited in claim 10 further comprising performing the following steps before the step of writing a header:

detecting the type of tape drive performing the formatting;

issuing a unique command selecting said format.

12. The method of formatting recited in claim 11 wherein said tape drive responds with no error if said tape drive is capable of operating on tape having said format with an increased amount of data.

13. The method of formatting recited in claim 11 wherein said tape drive responds with an error if said tape drive is not capable of formatting tapes having said format with an increased amount of data; and issuing another command selecting a different format.

14. The method recited in claim 10 wherein said tracks of data are overlapping.

* * * * *